United States Patent [19]
Gaylord

[11] 3,767,144
[45] Oct. 23, 1973

[54] SELECTIVE SINGLE POINT RELEASE FOR PARACHUTE HARNESS
[75] Inventor: John A. Gaylord, Greenbrae, Calif.
[73] Assignee: H. Koch & Sons, Inc., Corte Madera, Calif.
[22] Filed: Oct. 20, 1971
[21] Appl. No.: 190,739

[52] U.S. Cl............ 244/151 A, 24/205.17, 297/285
[51] Int. Cl. ...................... B64d 17/32, A44b 21/00
[58] Field of Search.................... 24/205.17, 205.18, 24/205.19, 73.05; 244/122 B, 151 A

[56] References Cited
UNITED STATES PATENTS
3,277,545  10/1966  Martin .............................. 24/205.17
3,564,672  11/1968  McIntyre ......................... 26/205.19
3,639,948   3/1970  Sherman........................... 24/205.17

FOREIGN PATENTS OR APPLICATIONS
20,617   11/1918  France............................. 24/205.17
700,791   3/1931  France............................. 24/205.17
768,629   8/1934  France............................. 24/205.17
915,168   1/1963  Great Britain................... 24/205.17

Primary Examiner—Bernard A. Gelak
Attorney—George B. White

[57] ABSTRACT

A casing supported on the crotch belt in convenient position accessible to all the straps of a harness has a plurality of sockets; the various straps of the harness have plugs insertable in the respective sockets; a spring pressed pawl projecting into each socket for engagement with a keeper notch in the adjacent plug; an individually shiftable actuating element engages certain of the pawls so that when it is shifted it withdraws the pawls from the selected plugs and releases them; another shiftable actuating element is capable of similarly withdrawing the other pawls from the respective plugs; an exterior manipulating device is provided for shifting the second mentioned actuating element; the connection between the first mentioned actuating element and the second mentioned actuating element is such that the first element can be shifted individually for releasing the selected plugs, but be shifted also by the second element when the second element is shifted by said exterior manipulating device.

7 Claims, 4 Drawing Figures

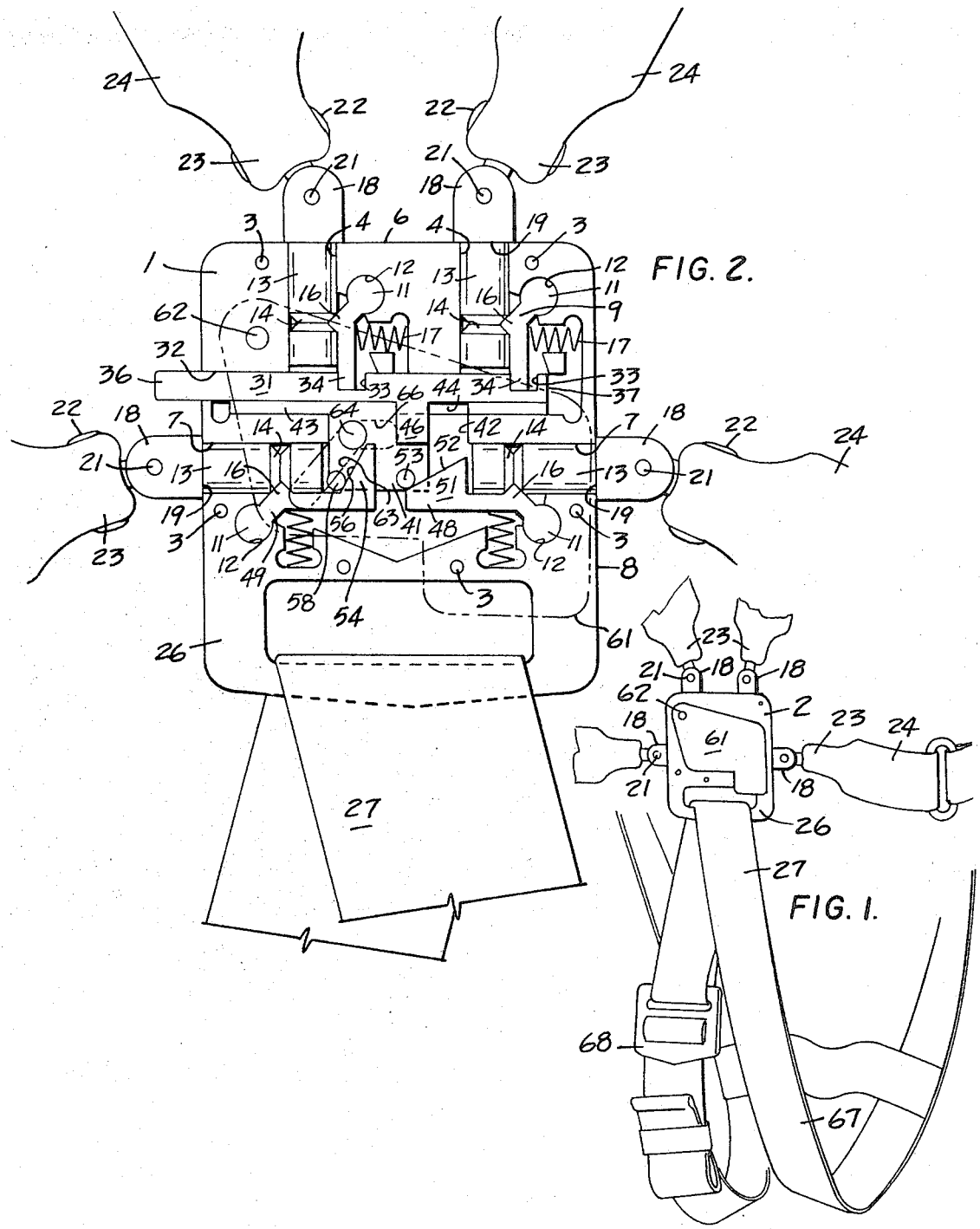

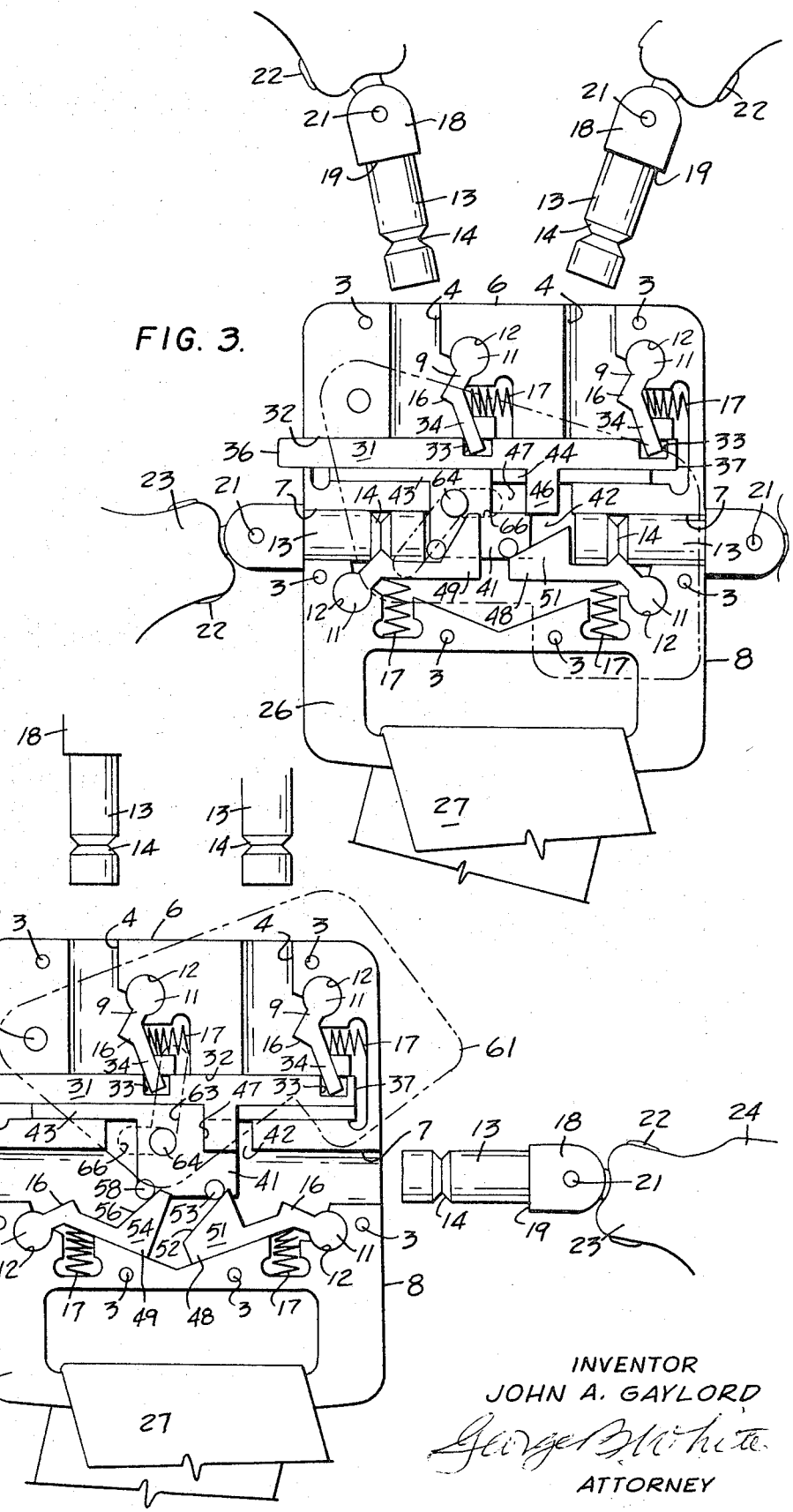

SELECTIVE SINGLE POINT RELEASE FOR PARACHUTE HARNESS

BACKGROUND OF THE INVENTION

There were several various improvements on parachute harness and their connection to a single point manipulable release, which are of great importance because the safety of aircraft personnel depends on the facility of manipulation of such release.

While the previous devices provide for simultaneous release of all the straps from a single connector, it is desirable sometime that quick release be accomplished of only certain selected straps, while the others remain connected.

The primary feature of this improvement is to provide an individual shifting device for releasing certain selected straps but leaving other straps connected, but to provide also a single manipulating device for quickly releasing all the straps when required.

Another feature of the invention is to reduce the number of straps that are connected to the single release by interconnecting the leg belts to form a crotch belt extending upwardly from the crotch of the person and supporting the single release on the crotch belt when all the straps are released; this simplifies the strap connections as well as suspends the single release conveniently for speedy connection of all the straps.

DESCRIPTION OF FIGURES

FIG. 1 is a fragmental perspective view showing the single point release connected to the crotch belt and other straps of the parachute harness.

FIG. 2 is a view on an enlarged scale of the single release with the cover plate removed and all the straps connected.

FIG. 3 is a view of the single release showing two of the straps released.

FIG. 4 is a view of the single release showing the manipulating handle in position with all the strap connections, except the crotch belt released.

DETAILED DESCRIPTION

The single release has a casing 1 which in the present form is a comparatively thick plate which is covered by a cover plate 2 indicated only in FIG. 1 which is detachably secured in plate by suitable screws in screw holes 3.

A pair of sockets 4 extend inwardly from the top edge 6 of the casing 1 in the perpendicular operating position shown in the drawings. A side socket 7 extends from each side 8 inwardly spaced below the inner end of the perpendicular sockets 4. In a suitable cavity adjacent to each perpendicular socket 4 is provided a pawl 9, a cylindrical hub 11 of which is pivotally held in a corresponding cylindrical cavity 12. A connection plug 13 is insertable in each socket 4 and 7 respectively. An annular keeper groove 14 on each plug 13 is engageable by a prong 16 on the adjacent pawl 9. A coil spring 17 urges each pawl 19 toward the adjacent plug 13 for interlocking the prong 16 with the keeper groove 14. Each plug has a head 18 which forms a shoulder 19 so spaced from the keeper groove 14 as to align the keeper groove 14 with the prong 16 whenever the shoulder 19 abuts the adjacent top 6 or side 8 of the casing 1. In each head 18 is a pivot pin 21 to pivotally hold a suitable cross head 22 which is suitably fixed into the usual loop 23 in the end of the respective strap 24.

On the lower edge or side of the casing 1 is a fixed loop 26 in which is held the crotch belt 27 of the harness, as shown in FIG. 1.

An actuating bar 31 is slideable in a channel 32 in the casing 1 intersecting at right angles the inner ends of the top sockets 4. The actuating bar 31 has a pair of elongated notches 33 adjacent the respective pawls 9 so that the fingers 34 of the pawls 9 project into the respective notches 33. A button end 36 of the actuating bar 31 projects beyond the adjacent side of the casing 1. The inner end 37 of the actuating bar 31 is spaced from the inner end of the channel 32 so as to leave space for pushing the actuating bar 31 inwardly of the channel. Thus by pushing the button end 36 the actuating bar 31 is shifted inwardly of the channel pushing the pawl fingers 34 from the position shown in FIG. 2 into the position shown in FIG. 3 thereby withdrawing the respective prongs 16 from the adjacent keeper grooves 14 and releasing the respective plugs 13. The coil springs 17 bearing on the respective pawls 9 shift the pawl fingers 34 and the actuating bar 31 into the initial position shown in FIG. 2.

An actuating block 41 is shiftable in a pocket 42 parallel with the channel 32. On the top of the block is formed a guide bar 43 slideable in an enlarged bottom portion of the channel 32 and being in sliding contact with the bottom of the actuating bar 31 so as to permit the individual sliding of the actuating bar 31. The guide bar 43 has an elongated slot 44 to accommodate an arm 46 extended therethrough from the actuating bar 31. The arm 46 fits into an abutment pocket 47 in a side of the actuating block 41 as shown in FIG. 2 so that when the actuating block 41 is shifted in the pocket 42 it abuts the arm 46 and shifts the actuating bar 31, but when the actuating bar 31 is shifted individually the arm 46 moves out of the abutment pocket 47 independently as shown in FIG. 3.

Pawls 48 and 49 are in cavities adjacent coil springs 17 so that the respective prongs 16 are interlocked with the keeper grooves 14 of the respective plugs 13. The pawl 48 has a head 51 with an inclined abutment face 52 adjacent a fixed button 53 on the actuating block 41 so that as the block 41 is shifted from the position shown in FIG. 2 into the position shown in FIG. 4, the button 53 rides on the abutment face 52 and pushes the pawl 48 away from the socket 7 for withdrawing the prong 16 from the keeper groove 14 of the adjacent plug 13.

The pawl 49 also has a head 54 thereon with an inclined abutment face 56 adjacent another button 58 on the actuating block 41, so positioned that when the actuating block 41 is shifted from the position shown in FIG. 2 into the position shown in FIG. 4 it pushes the pawl 49 away from the adjacent socket 7 to release the respective plug 13 as heretofore described.

The actuating block 41 is shifted by an exterior manipulating device, which in the present illustration is a flat handle 61 pivoted on a pivot 62 in the casing. The pivot extends through the cover plate 2. The handle plate 61 has an elongated slot 63 in engagement with a pin 64 extended from the actuating block 41 through a horizontal slot 66 in the cover 2 indicated in broken lines. The slot 63 is at such an angle relative to the pivot pin 62 that as the handle plate 61 is turned from the position shown in FIG. 2 into the position shown in FIG.

4, it pushes the pin 64 in the cover guide slot 66, whereby the actuating block 41 is pushed for withdrawing all the pawls from all the plugs as heretofore described.

The crotch belt 27 is formed by connecting the leg belts 67 through a suitable clasp 68 after one of the leg belts 67 is drawn through the fixed loop 26 as shown in FIG. 1 In this manner the single release always remains attached to the harness and when the person places the single release in front he also pulls the crotch belt 27 and the leg belts 67 in position and then quickly can connect all the other straps by inserting the respective plugs 13 into the respective sockets 4 and 7. In the event the person wants to release only the top plugs from the top sockets 4, that can be accomplished by simply pushing the button end of the actuating bar 31 and thus selectively releasing only the two top plugs 13. When simultaneous release of all the plugs is required the person turns the handle 61 into the position shown in FIG. 4 and as the actuating block 41 is pushed it also pushes the actuating bar 31 for simultaneously withdrawing of the pawls from all the plugs and thereby releasing all the straps at once, the releasing device remaining attached to the harness by the crotch belt 27.

I claim:

1. In a selective single point release for straps of a harness,
   - a casing having a plurality of edge sockets extending inwardly from one edge of said casing, and having side sockets extending inwardly from opposite sides of the casing in about the same plane as said edge sockets,
   - a strap connection plug insertable into each socket, each plug having an indent,
   - a pawl journalled in said casing adjacent each socket,
   - a projection on each pawl engageable with the indent of the adjacent plug for locking the plug in position,
   - spring means normally to urge each pawl into plug locking position,
   - a releasing device comprising
   - a bar reciprocable in said casing,
   - a part of each pawl at said edge pockets being connected to said bar so as to turn the respective pawls into plug releasing position whenever said bar is moved in one direction,
   - a reciprocating member in said casing,
   - a part of each pawl at said side pockets being connected to said reciprocating member so as to turn the respective pawls whenever said reciprocating member is moved in one direction,
   - means to connect said bar to said reciprocating member for unobstucted movement in said one direction and for movement with said reciprocating member when the latter is moved in said one direction, respectively for separately releasing said pawls at said edge sockets and for releasing all of said pawls,
   - means accessible from outside of said casing for moving said bar in said one direction at will,
   - and manipulating means on the outside of said casing connected to said reciprocating means for moving said reciprocating member for releasing all the pawls.

2. In a selective single point release specified in claim 1 and
   - said connecting means including
   - an abutment on said reciprocating member facing in said one direction,
   - an extension from said bar engageable with said abutment with freedom of independent movement in said one direction.

3. In a selective single point release specified in claim 1, and
   - an extension on one end of the bar extended to the outside of the casing for manipulation to push said bar in said one direction.

4. In a selective single point release specified in claim 1, and
   - said spring means urging said pawls and said bar and said reciprocating member oppositely to said one direction.

5. In a selective single point release specified in claim 1, and
   - said manipulating means including an accessible face plate on said casing,
   - a handle pivoted on said plate,
   - said plate having a slot parallel with said one direction and in registry with said reciprocating member,
   - a pin extended from said reciprocating member through said parallel slot,
   - said handle plate having a passage therein and said pin extending into said passage,
   - said passage being at such angle relative to the pivot of said handle as to push said pin in said slot and said reciprocating member in said one direction when said plate is turned from a locking into a releasing position thereby to release all the pawls from all the plugs.

6. In a selective single point release specified in claim 5, and
   - said reciprocating member being a reciprocating block,
   - said casing having elongated cavities for guiding the reciprocation of said block and of said bar.

7. The selective single point release specified in claim 1, and leg belts on said harness being connected together to form a crotch harness extended between the legs and secured to said casing for supporting said casing after said single release.

* * * * *